United States Patent [19]

Jones

[11] Patent Number: 5,496,148
[45] Date of Patent: Mar. 5, 1996

[54] WORKPIECE CARRIER FOR TRANSFER MACHINES

[75] Inventor: Joel Jones, Windsor, Canada

[73] Assignee: Tri-Way Machine Ltd., Windsor, Canada

[21] Appl. No.: 168,146

[22] Filed: Dec. 17, 1993

[51] Int. Cl.⁶ .................................................. B65G 35/00
[52] U.S. Cl. ..................... 414/749; 198/468.2; 294/119.1
[58] Field of Search ................................ 414/749, 751, 414/753, 741, 626, 621, 623, 736, 416; 198/468.2; 294/116, 119.1, 94, 103.1

[56] References Cited

U.S. PATENT DOCUMENTS

| | | | |
|---|---|---|---|
| 2,056,070 | 9/1936 | Menough | 198/774.1 X |
| 3,143,217 | 8/1964 | Andersen | 198/468.2 X |
| 4,709,803 | 12/1987 | Swiderski | 414/753 X |
| 5,090,757 | 2/1992 | Huber et al. | 294/119.1 |
| 5,193,662 | 3/1993 | McCulloch et al. | 198/774.1 |

*Primary Examiner*—Donald W. Underwood
*Attorney, Agent, or Firm*—Shoemaker and Mattare, Ltd.

[57] ABSTRACT

An improved workpiece carrier for transfer machines includes a frame, a plurality of upright support members, and a rack and pinion arrangement for adjusting the vertical position of the support members simultaneously with respect to the frame. A horizontally extending transfer bar is provided, and a plurality of carrier brackets are secured to the support member and in turn receive and support the transfer bar such as to permit free horizontal movement of the transfer bar in its long direction, while restraining movement of the transfer bar in directions perpendicular to its long direction. Affixed to the transfer bar are housing elements which include gripping devices for locating and retaining workpieces.

16 Claims, 6 Drawing Sheets

WORKPIECE CARRIER FOR TRANSFER MACHINES

This invention relates generally to the area of automated production lines, multi-station transfer machines, and has to do particularly with an improvement in such machines which allows flexible transference of workpieces.

BACKGROUND OF THIS INVENTION

In certain machining operations such as drilling, boring, etc., it is often desirable to have the flexibility to accommodate subtle variations in workpiece dimensions, as well as the ability to transfer a plurality of workpieces simultaneously. Conventionally, this type of workpiece transference has been accomplished by sliding, passive lift and carry, palletizing, and by squeezing or pinching the workpiece.

GENERAL DESCRIPTION OF THIS INVENTION

In view of the foregoing, it is an object of one aspect of this invention to provide a mechanism for the transference of one or more workpieces simultaneously through an automated production transfer machine, by means of actively locating, grasping, lifting and carrying.

It is an object of a further aspect of this invention to provide a transfer mechanism that can passively accommodate subtle workpiece variances, while offering a generic uniqueness that makes the mechanism easily adaptable to a variety of workpieces.

More particularly, this invention provides, in combination:

frame means, a plurality of upright support members, rack and pinion means for adjusting the vertical position of all support members simultaneously with respect to the frame means, an elongate transfer bar extending horizontally, carrier bracket means attached to each support member, said carrier bracket means receiving and supporting the transfer bar so as to permit free horizontal movement of the transfer bar in its long direction, while restraining movement of the transfer bar in directions perpendicular to its long direction, and housing means mounted on said transfer bar, said housing means having grip means for locating and retaining workpieces.

BRIEF DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
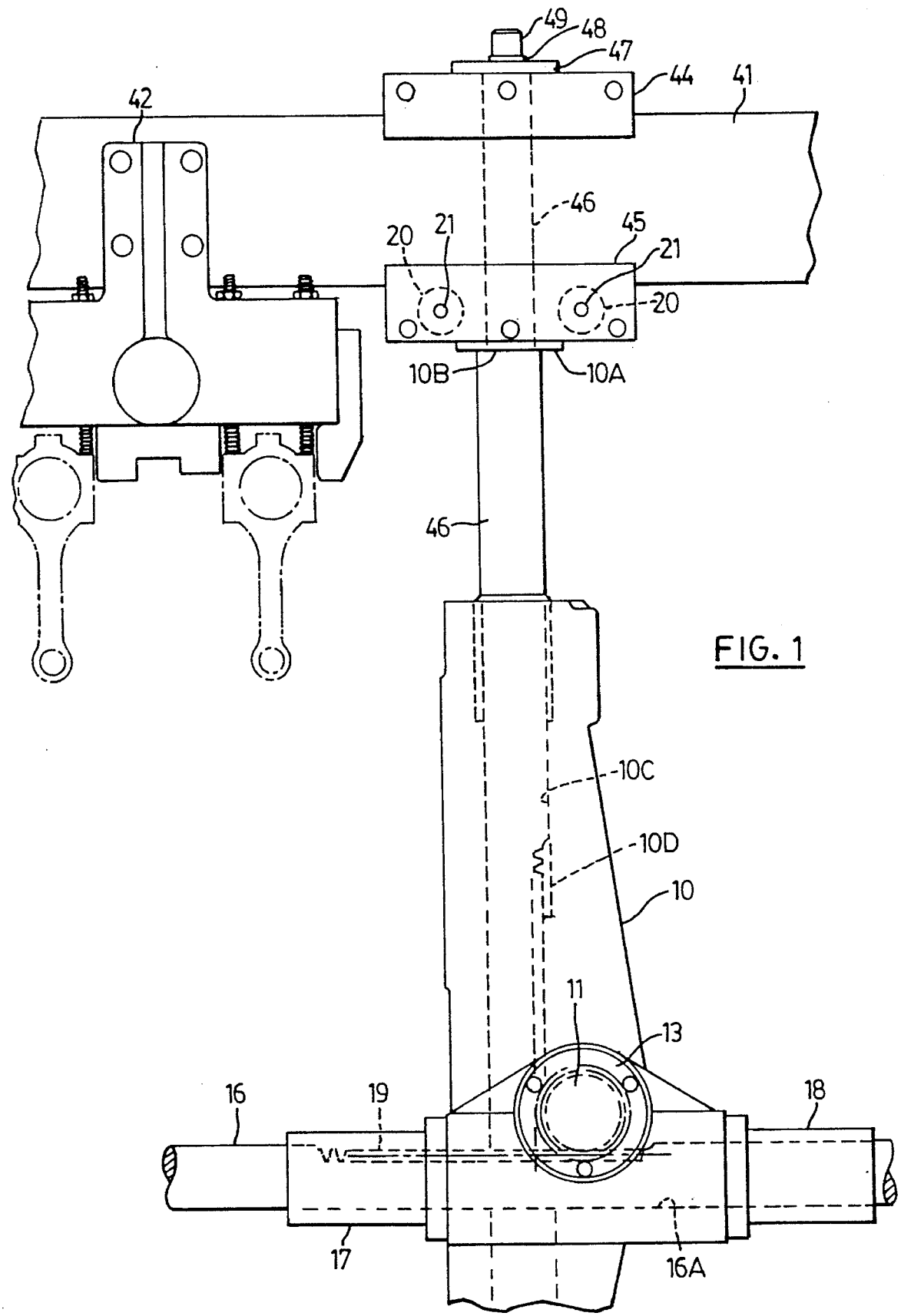
FIG. 1 is a partial elevation or face view of the mechanism of this invention, looking in a direction perpendicular to the direction of movement of the workpieces.

Attention is first directed to FIG. 1, illustrating a partial frontal elevation of the flexible workpiece carder assembly. In FIG. 1 there is shown a transfer bar 41 to which is bolted or otherwise secured a plurality of housings 42 that contain the components necessary for locating and retaining the workpieces. In the illustration of FIG. 1, only a single housing 42 is shown, and the workpieces are illustrated (in broken lines) as connecting rods. It will be understood from what follows that other workpieces could as readily be handled.

Figure 2:
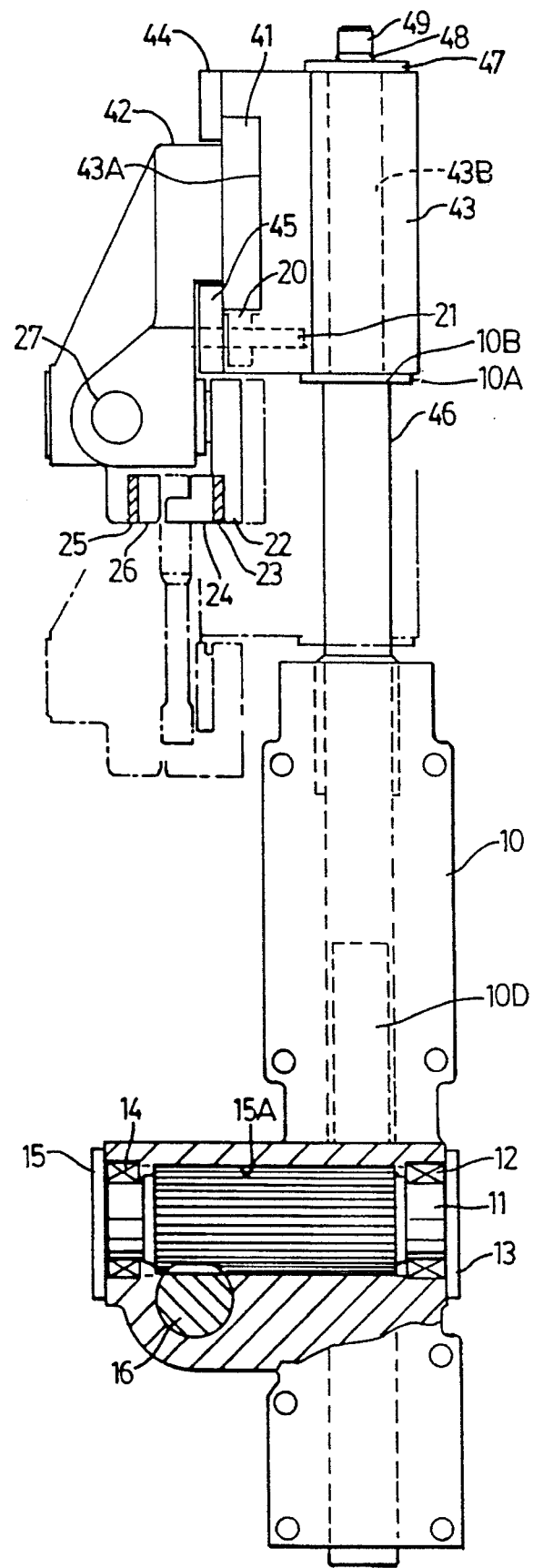
FIG. 2 is a partly sectioned end elevation of the mechanism shown in FIG. 1, i.e. looking in the direction parallel with the direction of workpiece transfer.

Looking at both FIGS. 1 and 2, there is provided a transfer bar carrier housing 43 which in FIG. 2 defines a leftwardly open recess 43A for receiving the transfer bar 41. The recess 43a is rectangular, as is the transfer bar 41 (seen in end view in FIG. 2). An upper transfer bar retainer 44 slightly overlaps the upper margin of the transfer bar 41, while a lower transfer bar retainer 45 slightly overlaps the lower margin of the transfer bar 41. The retainers 44 and 45 are bolted in place, as can be seen in FIG. 1, and thus are removable in order to allow the transfer bar to be removed from engagement with the transfer bar carrier housing 43.

Associated with each transfer bar carrier housing 43 is a pair of free-turning rollers 20 which rotate on pins 21 that are supported in the transfer bar carrier housing. The provision of the rollers 20 allows longitudinal movement of the transfer bar 41 with respect to the carrier housing 43, at a low level of friction.

Also illustrated in FIGS. 1 and 2 is an upright support member in the form of a rod 46, which is of uniform circular section throughout, except for the uppermost portion, which is of reduced diameter. The reduction of the diameter provides a ledge 10B against which a flat washer 10A abuts. The flat washer 10A supports the transfer bar carrier housing 43 already described, it being understood that the carrier housing 43 provides an internal upright bore (43B), through which the reduced portion of the rod 46 extends. At its upper end, the rod 46 has an axial tapped hole for receiving a cap screw 49. A flat washer 47 and a lock washer 48 transfer downward force from the head of the cap screw 49 to the transfer bar carrier housing 43, thus locking the latter in place with respect to the rod 46.

Attention is now directed to the lower portions of FIGS. 1 and 2, where the numeral 10 identifies a rack and pinion housing which defines an internal passage 10C for receiving the lower portion of the rod 46. Cut into the outer surface of the lower part of rod 46 is a gear rack 10D of known construction. Cooperating with and engaging the rack 10D of the rod 46 is a pinion gear shaft 11 which is mounted on bearings 12 and 14 for free rotation within a suitable cavity 15A in the housing 10. Covers 13 and 15 are provided to retain the bearings 12 and 14 in place, and to prevent the entry of dust or grit.

Also seen in the lower portions of FIGS. 1 and 2 is a horizontally extending elongate actuation bar 16 which is adapted for axial movement in the direction of its elongation, within a bore 16A provided in the housing 10. The actuation bar 16 has a toothed gear rack along its length (shown at 19 in FIG. 1), which is shielded against the entry of dust, dirt, etc. by cylindrical dirt covers 17 and 18 attached to the housing 10. It is to be understood that there is provided a plurality of support rods 46 and associated structure, all supporting the same transfer bar 41. This means that there will be a plurality of pinion gear shafts 11 (one for each rod 46). The actuation bar 16 is designed and positioned so as to simultaneously engage the teeth of all of the pinion gear shafts 11, such that axial movement to the actuation bar 16 simultaneously rotates all of the pinion gear shafts 11, which in turn causes simultaneous vertical movement of the associated rods 46.

Figure 3:
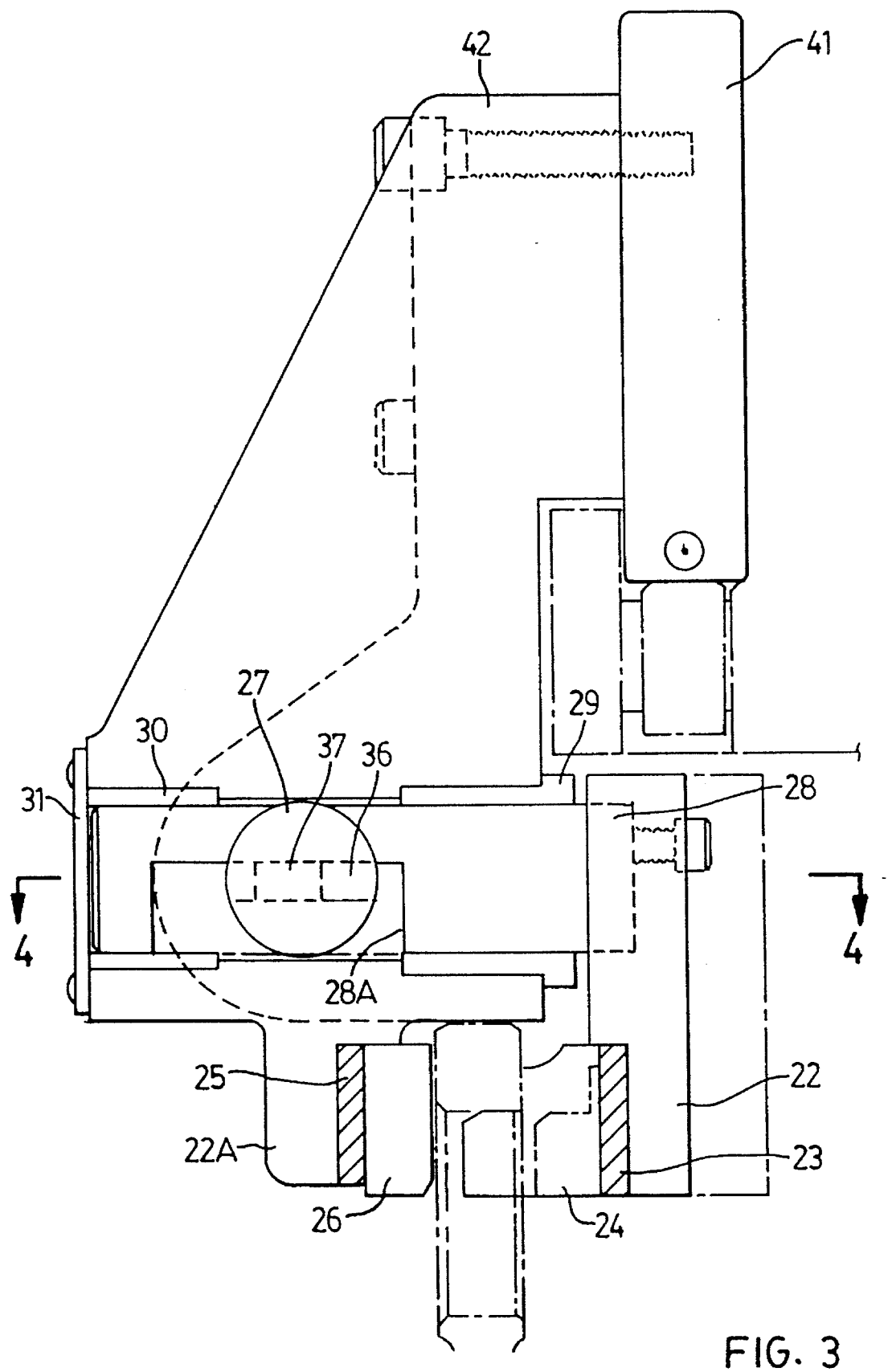
FIG. 3 is an end elevational drawing of a portion of the mechanism illustrated in FIG. 2, but to a larger scale.

Attention is now directed to FIG. 3, which is a somewhat schematic, partly cut-away elevational view of the workpiece carrier housing 42, showing a wedge cam arrangement used to locate and retain the workpiece (in the illustrated embodiment, a connecting rod). More specifically, there is shown an elongate wedge rod 27 which links all of the housings 42 and which extends parallel with the transfer bar 41. Each housing 42 includes a cam bar 28 extending horizontally at right angles to the direction of elongation of the rod 27. A workpiece locator plate 22 is secured against one end of the cam bar 28 by suitable bolts or other fasteners, so that the two components move together. The workpiece locator plate 22 supports a locator element 24 which may be regarded as a grip member.

FIG. 3 shows the leftward portion of the locator 24 in a solid line position and in a broken line position. The solid line position corresponds to the gripping of the workpiece, whereas the broken line position is that in which the locator 24 is withdrawn to allow the workpiece to be removed or inserted.

Fixed with respect to the housing is a downwardly depending portion 22A which, through a fitting spacer 25, supports a work part retainer 26. A fitting spacer 23 is also provided between the workpiece locator plate 22 and the locator 24.

By a camming mechanism to be described below, linear movement of the rod 27 causes the cam bar 28 to move in the direction of its axis, thus moving the locators 24 into and/or out of engagement with the workpieces. The cam bar 28 is guided within bushings 29 and 30, and moves only as a result of actuation of the rod 27. A cap 31 is permanently affixed to the housing 42 for the purpose of retaining the bushing 30 in place, and protecting this mechanism from contamination.

Figure 4:
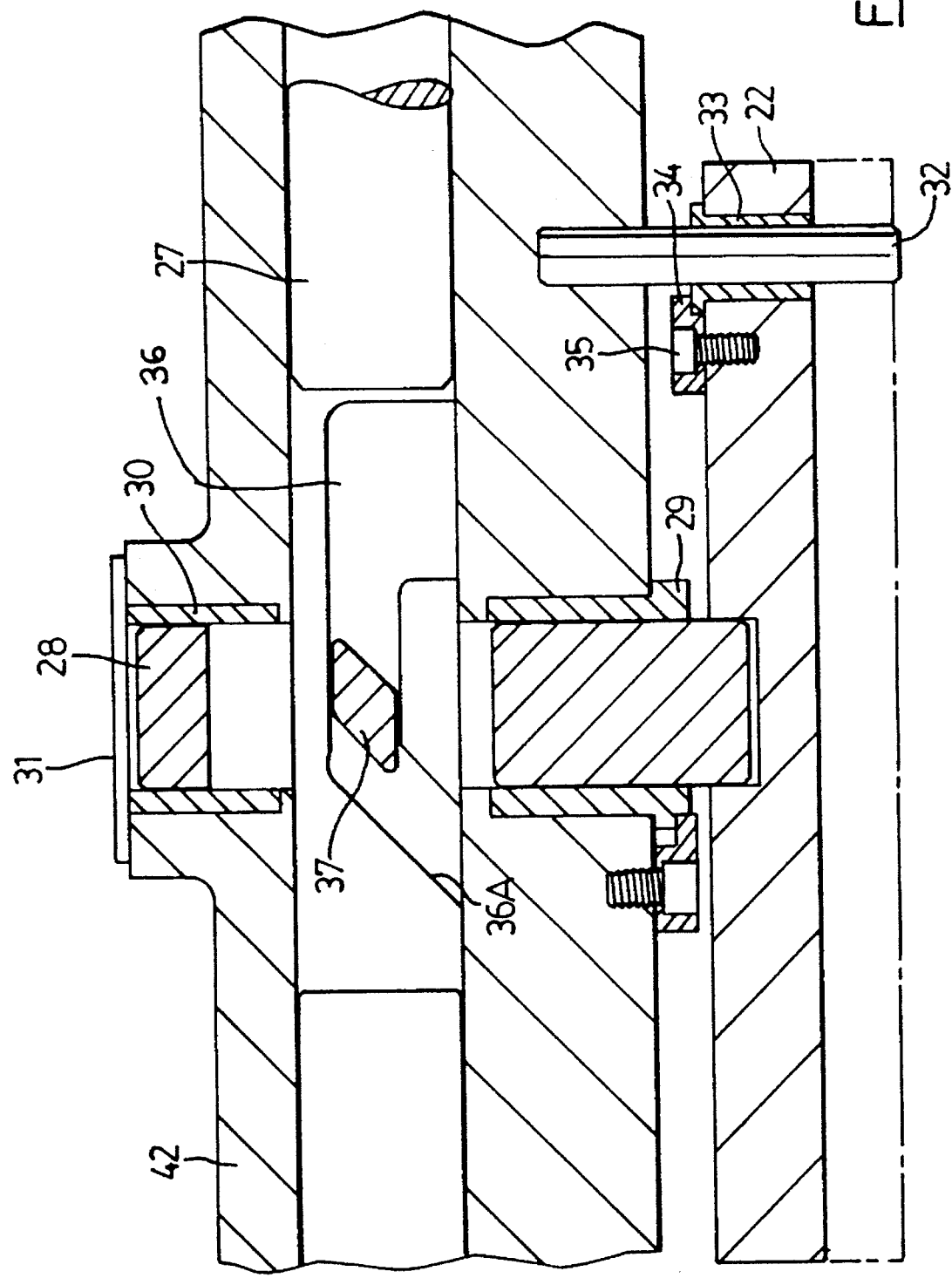
FIG. 4 is a part plan view and part horizontal section of the structure shown in FIG. 3, the section being taken along the line 4—4 in FIG. 3.

FIG. 4 is taken partly at the line 4—4 in FIG. 3, and shows the function of the main components in the housing 42 in horizontal section. The cam bar 28 is machined so as to provide a recess 28A within which a cam block 37 extends downwardly. The rod 27 is likewise machined so as to define an internal cam track 36 within which the cam block 37 can move. The cam track 37 includes an oblique portion 36A, which cooperates with the cam block 37 such that, upon rightward movement of the rod 27 beyond the position illustrated in FIG. 4, the cam block 37, and of course the entire cam bar 28, will be urged in the downward direction as viewed in FIG. 4 (the rightward direction as viewed in FIG. 3).

Also illustrated in FIG. 4 is one of a plurality of guide rods 32 which are secured to the housing 42 (at their upper ends as pictured in FIG. 4).

The guide rods 32 locate the plate 22 by virtue of entering guide bushings 33 which are secured to the workpiece locator plate 22 by means of bushing clamps 34 which trap the guide bushings 33 and are retained with bushing clam screws 35. This allows the locator plate 22 to move freely with the cam bar 28, while being restrained against movement in a direction perpendicular to its long direction.

Figure 5:
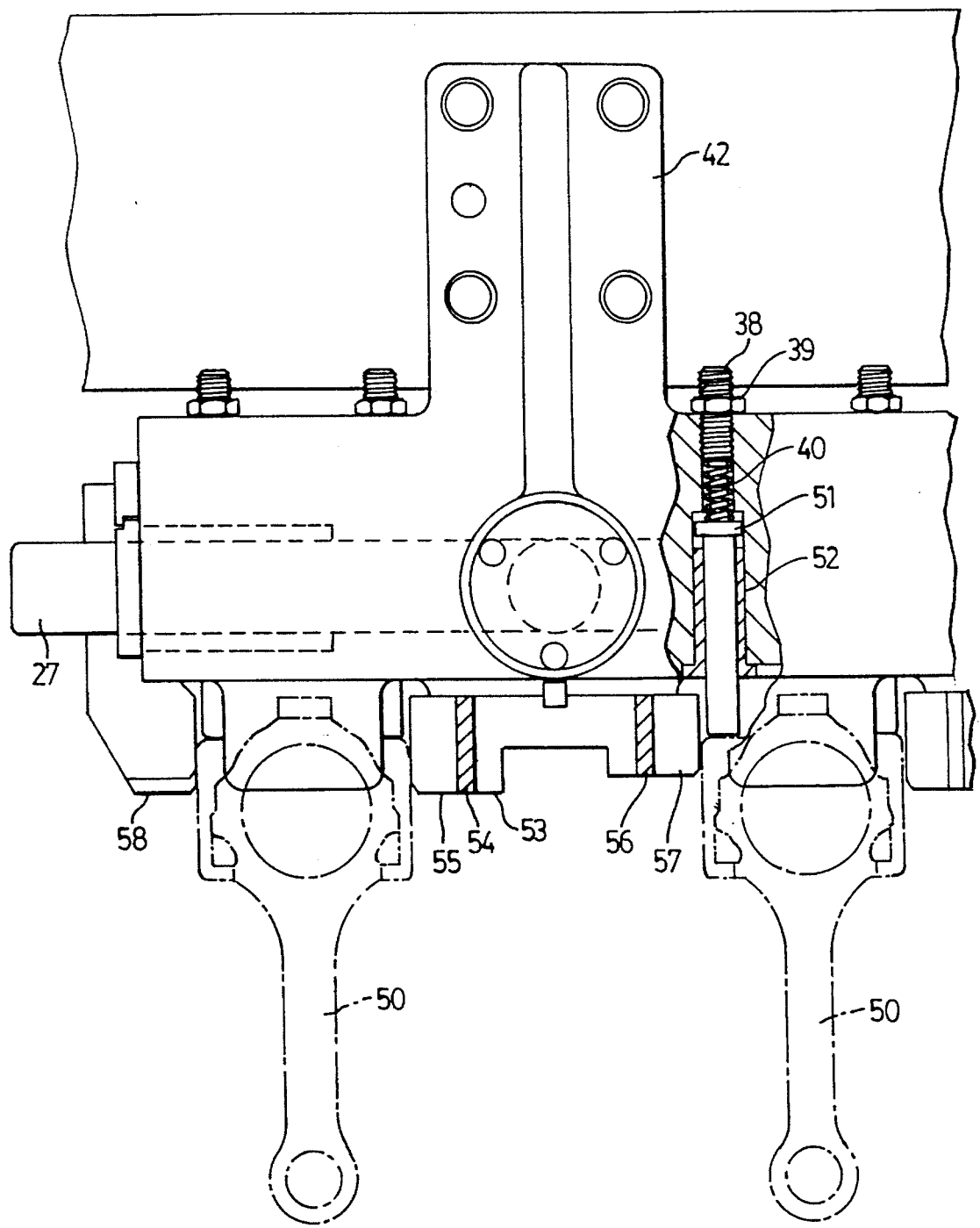
FIG. 5 is an elevational view similar to that in FIG. 1, but to a larger scale and showing greater detail.
Figure 6:
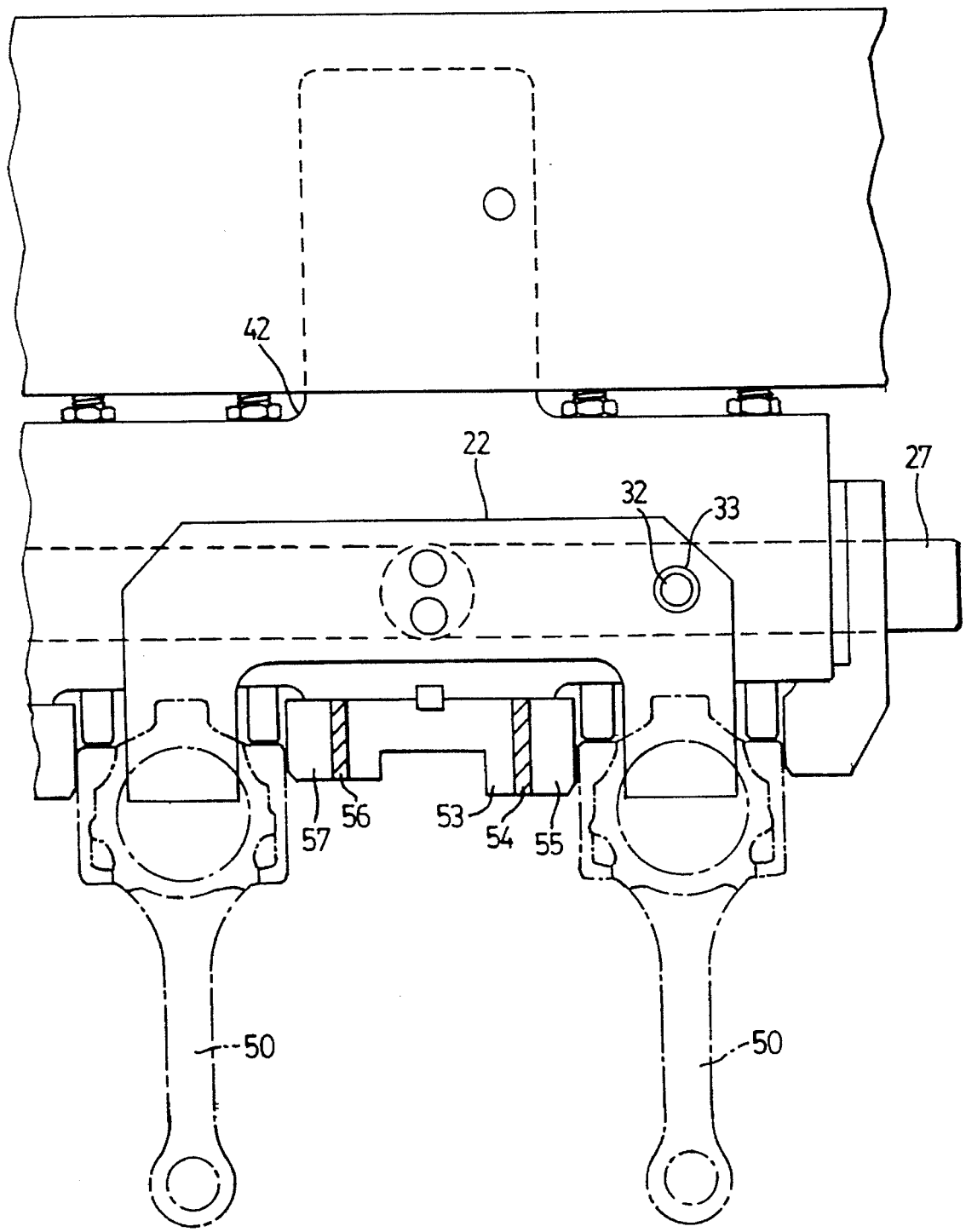
FIG. 6 is a rear elevation of the structure shown in FIG. 5.

Attention is now directed to FIG. 5, which is useful for illustrating the passive locating features of the workpiece carrier. In the particular case illustrated, the workpiece is an automotive connecting rod 50. In this particular case, the locators are applied as follows:

The vertical plumb of the workpiece is controlled through the use of vertically oriented plungers 51 (only one illustrated). More specifically, when the workpiece carrier assembly acquires a workpiece, the connecting rod makes contact with two spring-loaded plungers 51 in the area of the connecting rod cap bolt holes. The spring-loaded plungers 51 are guided within bushings 52 which reside within the workpiece carrier housing 42. The pressure of each plunger 51 on the workpiece is adjustable by advancing or retracting an adjustment screw 38 which in turn compresses or extends spring 40. When the correct spring pressure has been achieved, the adjustment screw 38 is secured in position by adjusting screw nut 39. The number of plunger assemblies will vary depending upon the number of workpieces that the carrier is designed to accommodate.

In addition to vertical plumb, the workpiece is also passively located laterally (i.e. in the plane of transfer). Lateral location is accomplished through an arrangement of fixed and fitted locators, which are identified as elements 53–58. As seen in FIG. 5, these locators are positioned to guide the outsides of the connecting rod, i.e. parallel and adjacent to the bolt hole areas. Spacers 54 and are used for finite location of members 55 and 57 by machining the thicknesses of the spacers to achieve a desired fit between the workpiece and members 55, 57 and 58.

The workpiece carrier design disclosed hereinabove presents several advantages over conventional transfer systems, and these are as follows:

1. During transfer, the workpieces are fully restrained and are thus not subject to scarring or defacing due to sliding friction.

2. During transfer, the workpieces are not free to bounce or become dislodged out of position due to vibration or shock.

3. The transfer mechanism described herein maintains positive location and retention of the workpiece during transfer and deposition into a work fixture, and thus does not rely upon gravity to assist in either of these functions.

4. The transfer mechanism herein described can accommodate subtle variations in workpiece size without the need to change the workpiece contact components or the operating parameters.

5. The generic design of the mechanism is readily adaptable to a variety of transfer distances, lift heights and workpiece quantities.

6. The workpiece carrier design and operation provide easy change-over to accommodate a variety of workpieces. In many cases, only the portions in contact with the workpiece will need to be changed.

7. Actuation of the various rods, bars, racks and shafts can be accomplished hydraulically, pneumatically or mechanically.

While one embodiment of this invention has been illustrated in the accompanying drawings and described hereinabove, it will be evident to those skilled in the art that changes and modifications may be made therein, without departing from the essence of this invention as set forth in the appended claims.

The embodiments of the invention in which an exclusive property or privilege is claimed are defined as follows:

1. In combination:

frame means, a plurality of upright support members supported on said frame means, an elongate transfer bar extending horizontally, rack and pinion means for adjusting the vertical position of all support members simultaneously with respect to the frame means said rack and pinion means comprising a gear rack provided along each upright support member, for each gear rack a pinion gear shaft extending substantially horizontally in a direction perpendicular to the long direction of the transfer bar, and having elongate gear teeth engaging the respective gear rack, and a horizontally extending elongate actuation bar adapted for axial movement in the direction of its elongation, the actuation bar having gear rack teeth along its length, the actuation bar simultaneously engaging the teeth of all said pinion gear shafts, such that axial movement of the actuation bar simultaneously rotates all said pinion gear shafts, which in turn cause simultaneous vertical movement of the associated upright support members, carrier bracket means attached to each support member, said carrier bracket means receiving and supporting the transfer bar so as to permit free horizontal movement of the transfer bar in its long direction, while restraining movement of the transfer bar in directions perpendicular to its long direction, and housing means mounted on said transfer bar, said housing means having holder means for locating and retaining workpieces.

2. The combination claimed in claim 1, in which each said carrier bracket means includes roller means for supporting part of the weight of the transfer bar.

3. The combination claimed in claim 1, in which each said carrier bracket means includes roller means for supporting part of the weight of the transfer bar, in which said housing means includes a plurality of housings spaced at intervals along the transfer bar, and in which the structure of the carrier bracket means and the housings is such as to allow each housing to move horizontally past a carrier bracket means without mechanical interference.

4. In combination:

frame means, a plurality of upright support members supported on said frame means, rack and pinion means for adjusting the vertical position of all support members simultaneously with respect to the frame means, an elongate transfer bar extending horizontally, carrier bracket means attached to each support member, said carrier bracket means receiving and supporting the transfer bar so as to permit free horizontal movement of the transfer bar in its long direction, while restraining movement of the transfer bar in directions perpendicular to its long direction, a plurality of housing means mounted on said transfer bar, each said housing means having holder means for locating and retaining workpieces, said holder means including at least one locator member mounted for movement between an engaging position and a non-engaging position with respect to a workpiece, elongate rod means operatively connected to all said housing means, such that upon movement of the elongate rod means from a first position to a second position, all said locator members move simultaneously from said non-engaging position to said engaging position, wherein said rack and pinion means comprises: a gear rack provided along each upright support member, for each gear rack a pinion gear shaft extending substantially horizontally in a direction perpendicular to the long direction of the transfer bar, and having elongate gear teeth engaging the respective gear rack, and a horizontally extending elongate actuation bar adapted for axial movement in the direction of its elongation, the actuation bar having gear rack teeth along its length, the actuation bar simultaneously engaging the teeth of all said pinion gear shafts, such that axial movement of the actuation bar simultaneously rotates all said pinion gear shafts, which in turn cause simultaneous vertical movement of the associates upright support members.

5. A transfer mechanism for workpieces having recesses, said mechanism comprising:

a horizontally extending transfer bar, frame means, a plurality of upright support members supported on said frame means, and means for adjusting the vertical position of all said support members simultaneously with respect to the frame means, carrier bracket means attached to each support member, said carrier bracket means supporting and guiding the transfer bar for longitudinal horizontal movement thereof, while restraining movement of the transfer bar in directions perpendicular to its length, housing means mounted on said transfer bar, said housing means having means defining at least one pocket to receive a workpiece, said pocket having width, length and depth dimensions extending in mutually perpendicular directions and said housing means having locator means for positioning and retaining a workpiece in said pocket;

said locator means being movable widthwise of the pocket between a retracted position, wherein the workpiece can be freely inserted in or removed from the pocket, and an engaged position wherein the workpiece is engaged and retained by the locator means, said locator means further including a portion which in the engaged position of the locator means lies within the recess in the workpiece to block removal of the workpiece from the pocket, and actuator means for moving said locator means between said engaged position and said retracted position.

6. The transfer mechanism as claimed in claim 5 further including spacer means for adjusting the pocket's size in its length dimension to closely confine the workpiece in that direction.

7. A transfer mechanism as claimed in claim 5 wherein said actuator means provides a blocking action on said locator means when the latter is in said retracted position and in said engaged position.

8. A transfer mechanism as claimed in claim 5 including adjustable abutment means for engaging the workpiece in the depth direction of the pocket, such abutment means providing a seat for the workpiece such that the orientation of the workpiece can be varied by adjustment of said abutment means.

9. A transfer mechanism as claimed in claim 8 wherein said abutment means comprises a pair of plungers in said housing means and extending in the depth direction of said pocket, said plungers being spaced apart in the length direction of the pocket to engage the workpiece at correspondingly spaced locations thereon.

10. A transfer mechanism as claimed in claim 9 wherein said plungers are spring loaded.

11. A transfer mechanism as claimed in claim 6 wherein said housing means includes a plurality of said pocket defining means and locator means, and further including common actuator means coupled to the locator means of all said pockets.

12. A transfer mechanism as claimed in claim 5 wherein said length direction of the pocket exceeds said width direction.

13. A transfer mechanism as claimed in claim 5 wherein said length direction of the pocket is oriented essentially parallel to said transfer bar.

14. A transfer mechanism as claimed in claim 5 including a plurality of said housing means on said transfer bar, and wherein said actuator means is common to all said housing means.

15. A transfer mechanism as claimed in claim 14 wherein said common actuator means comprises an elongate rod which passes through all said housings and which cooperates with the respective locator means in each housing.

16. A transfer mechanism as claimed in claim 14 wherein each said carrier bracket means includes rollers for supporting the transfer bar for movement relative thereto, said carrier bracket means and said housing means being so constructed as to allow these to pass each other as the transfer bar is moved in its longitudinal direction.

* * * * *

UNITED STATES PATENT AND TRADEMARK OFFICE
CERTIFICATE OF CORRECTION

PATENT NO. : 5,496,148
DATED : March 5, 1996
INVENTOR(S) : Joel W. JONES

It is certified that error appears in the above-identified patent and that said Letters Patent is hereby corrected as shown below:

Column 2, line 9, change "carder" to --carrier--.

Column 3, line 24, change "leftward" to --rightward--.

Column 3, line 64, change "clam" to --clamp--.

Signed and Sealed this

Eighteenth Day of June, 1996

Attest:

BRUCE LEHMAN

Attesting Officer        Commissioner of Patents and Trademarks